United States Patent [19]
Seidman

[11] 3,900,044
[45] Aug. 19, 1975

[54] DETACHABLE TROUGH STRUCTURE
[76] Inventor: Leon Louis Seidman, 503 Elm Ave., Takoma Park, Md. 20013
[22] Filed: Sept. 21, 1973
[21] Appl. No.: 399,547

[52] U.S. Cl. .............. 137/360; 15/103; 15/250.01; 52/171; 118/501
[51] Int. Cl.² .. B05C 5/02; B05C 11/10; B05D 1/26
[58] Field of Search.. 15/104.8, 103, 248 R, 250.01, 15/250.11, 250.36; 52/171; 118/504, 505, 501; 119/72; 239/104; 137/360; 401/146; 222/108, 571

[56] References Cited
UNITED STATES PATENTS
| | | | |
|---|---|---|---|
| 1,146,497 | 7/1915 | Houdaille | 52/171 |
| 1,161,378 | 11/1915 | Day | 15/248 R |
| 2,311,670 | 2/1943 | Lamont | 15/250.01 |
| 2,574,042 | 11/1951 | Kunau | 15/248 R |
| 3,415,675 | 12/1968 | Allen | 118/501 |

FOREIGN PATENTS OR APPLICATIONS
| | | | |
|---|---|---|---|
| 507,916 | 9/1920 | France | 52/171 |
| 723,750 | 4/1932 | France | 15/250.01 |
| 826,057 | 12/1951 | Germany | 52/171 |

Primary Examiner—Martin P. Schwadron
Assistant Examiner—George L. Walton

[57] ABSTRACT

A detachable trough structure is provided by securing two strips of elastomeric material along longitudinal edge portions to form two opposing walls providing a generally V-shaped cross sectional space therebetween. The two secured strips may be stored in the form of a roll and a desired portion cut off as needed for a trough. One of the walls strips has a planar surface provided with an adhesive layer and vacuum cup formations for attaching the trough structure to a desired surface. The ends of the trough are closed in a liquid tight manner by clamping or pinching the wall ends of the trough by means of a U-shaped clamp. A coupling to couple adjacent ends of trough structure to form a longer trough structure is also provided.

11 Claims, 8 Drawing Figures

PATENTED AUG 19 1975   3,900,044

DETACHABLE TROUGH STRUCTURE

BACKGROUND OF THE INVENTION

This invention relates to detachable drip trough structure for the collection of liquids applied to vertical and inclined work surfaces, such as when washing walls, windows or the like, or when painting, coating and otherwise treating surfaces with liquids.

An object of this invention is to provide a trough structure made of elastomeric material having two spaced walls providing a generally V-shaped cross sectional space therebetween. The two wall structrue can be stored in the form of a roll and a desired length may be cut off therefrom whenever a definite length trough is desired.

A further object is to provide a trough structure which has means whereby it can be optionally attached to or detached from a surface.

A further object is to provide a coupling means for securing several trough lengths to form a longer length.

Another object is to provide a pinch valve clamp for closing the ends of the trough structure in a liquid tight manner.

Further objects and advantages will be apparent from the following description and accompanying drawings wherein.

Figure 1:
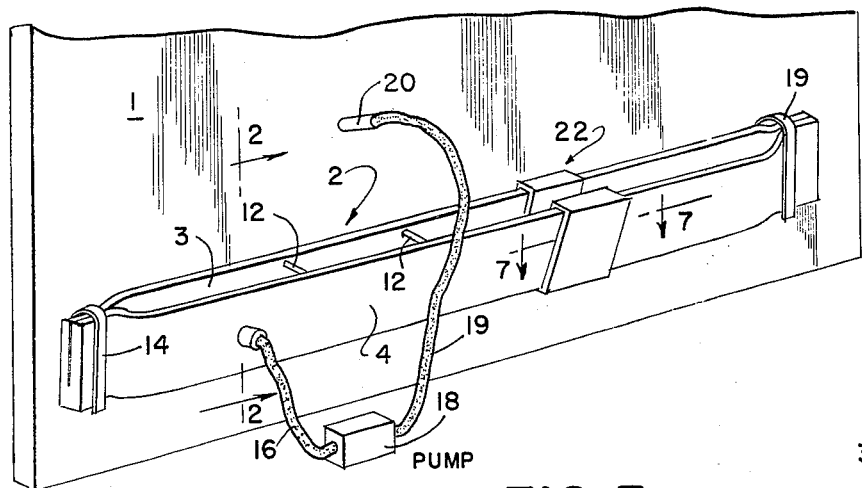
FIG. 1 is a perspective view of the trough attached to a support surface.

Referring to FIG. 1, character 1 denotes a generally vertical surface, such as a wall or window to which a liquid is to be applied for the purpose of washing, painting, coating, or other purpose. To catch the excess and dripping liquid from the operation, a detachable trough 2 is utilized.

Figure 2:
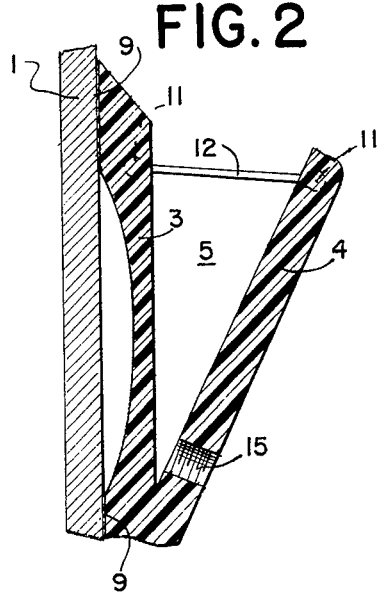
FIG. 2 is a sectional view taken along line 2—2 of FIG. 1.

Trough 2 comprises a support wall 3, a wall 4 spaced from and attached to the longitudinal lower edge portion of wall 3 to thereby form a trough space 5 having a generally V-shaped cross section, as illustrated in FIGS. 1 and 2. The walls 3 and 4 are fabricated from flexible elastomeric material, such as suitable plastic or rubber, by conventional means, such as be extrusion (FIG. 2) or by bonding a separate strip or wall 2 to a separate strip or wall 4 at bonding surface 6. It is contemplated that the stock form of trough 2, constituted by walls 3 and 4, will be of indeterminate length in the form of a roll of a double wall strip comprising walls 3 and 4 spaced close together in contact. Any desired length of trough body stock can then be cut off from the roll to extend across and below the wall area to which liquid is applied, as illustrated in FIG. 1.

Figure 3:
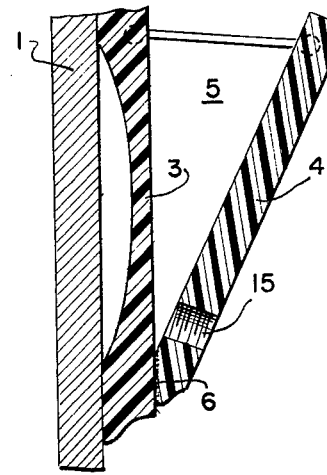
FIG. 3 is a view similar to FIG. 2 but showing a different embodiment.
Figure 4:
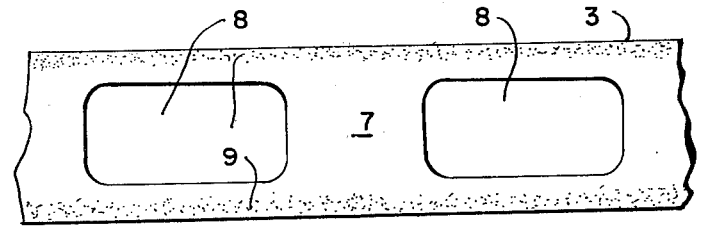
FIG. 4 is a front view of the supporting surface of the trough.

To secure the trough in a liquid tight manner to surface 1, the outer planar surface 7 of wall 3 is provided with several attaching means of which either or all may be utilized. As illustrated in FIGS. 2–4, surface 7 of wall 3 is formed with a series of recesses 8 therein. These recesses serve as vacuum cup means to hold the trough against surface 1 when squeezed thereagainst in the well known vacuum cup holding manner. Additionally, portions 9 of surface 7 may carry a layer of an adhesive medium, such as a pressure sensitive adhesive layer to further secure the trough 2 to surface 1. Thus when trough 2 is secured to surface 1, all dripping liquid will flow across the upper slanting face 10 of wall 3 into the trough space 5.

At times, through 2 may be of considerable length and subject to a weight of liquid therein sufficient to overcome the natural resiliency of wall 4 and tend to deflect wall 4 too far away from wall 3. To maintain the proper spacing between walls 3 and 4, there are provided pairs of small aligned recesses 11 spaced along walls 3 and 4. Headed or dumb-bell shaped struts 12 are forced into the pairs of recess 11 and thereby positively hold walls 3 and 4 in proper spaced relation to form space 5.

Figure 5:
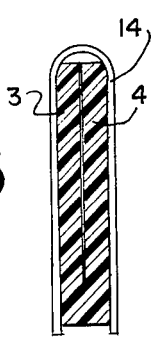
FIG. 5 is an end view of a closed end of the trough.

One or both ends of the trough are closed by clamp 14 which acts as a pinch valve. As illustrated in FIGS. 1 and 5, clamp 14 may assume the form of a U-shaped member. The ends of the trough walls 3 and 4 are pinched to bring the inner surfaces of the walls in contact and a clamp 14 is slipped thereover to hold the ends of the walls in liquid tight contact (FIG. 5) and thereby prevent flow of liquid through that end. The other end of the trough may be closed by a second clamp 14.

To drain the fluid from the trough, a threaded drain opening 15 is provided to which a hose 16 may be secured. To recycle or remove the liquid a pump 18 may be connected to hose 16 and the liquid discharged through hose 19 to any desired point. FIG. 1 illsutrates the recycling the liquid by utilizing the drained fluid to respray surface 1 through a nozzle 20.

Figure 6:
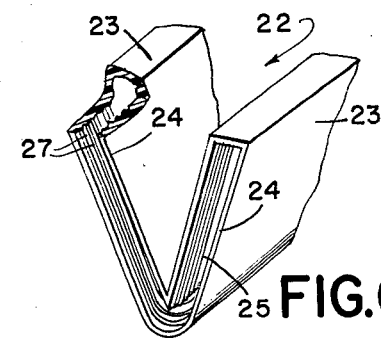
FIG. 6 is a front perspective view of a coupling with a portion broken away to show the interior of the cavity therein.
Figure 7:
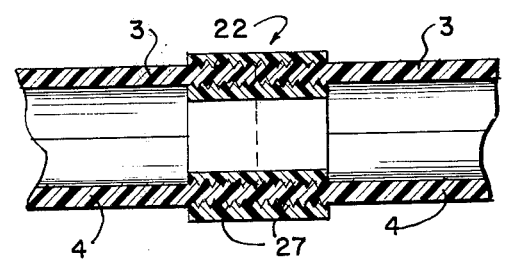
FIG. 7 is a sectional view taken along line 7—7 on FIG. 1.

At times it is desirable to couple several lengths of trough to make a trough of greater length and for this purpose a coupling 22 is utilized. As illustrated in FIGS. 6 and 7, coupling 22 comprises a body 23 made of thin rigid plastic in a generally V-shaped configuration (FIG. 6) having continuous wall means 24 which form a V-shaped space 25 complementary to the V-arrangement 5 of walls 3 and 4 of trough 2. The interior of the wall means 24 forms a trough space 25. The wall means is provided with parallel generally V-shaped ridges or serration 27. To couple two trough lengths, the adjacent ends are forces with opposite sides of coupling 22 into space 25, as illustrated in FIG. 7. Ridges or serrations 27 will embed in the material of the trough walls and thus act as liquid seal means, as well as retaining means. Thus, both ends of the trough bodies are secured to each other positively and in a liquid tight manner. The coupling is especially useful in uniting odd lengths of used trough bodies to form a trough of a desired length. The trough made up of the several odd lengths of old trough bodies may be secured to surface 1 by the vacuum cup formation 8 or by applying a new conventional adhesive layer means to surface 9, if the old adhesive layer is no longer effective.

Figure 8:
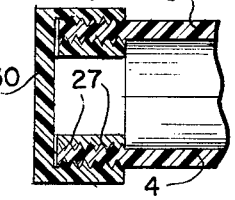
FIG. 8 is a sectional view of another embodiment of a trough end closure.

FIG. 8 illustrates another embodiment of means for closing a trough end. Closure 22' is similar to coupling 22 of FIGS. 6 and 7 except its wall means 24 do not form a through space 25. The end of the trough is closed off by a full end wall 30 which is integral with wall means 24 and extends across the trough space formed by walls 3 and 4.

It will be apparent that the embodiments shown are only examplary and that various modifications can be made therein without departing from the scope and spirit of the invention as defined in the appended claims.

I claim:

1. A detachable trough structure comprising a trough body formed by a first longitudinal wall having a planar outer surface, a top edge, a bottom edge and end edges, and a second longitudinal wall having a top edge, a bottom edge, and two end edges, said walls being of flexible elastomeric material and being secured together along the bottom edge of each wall in an angular spaced relationship to form a trough space therebetween having a generally V-shaped cross sectional configuration, said walls thus forming a triangular trough channel having an open top, a closed bottom, and opposed open ends, said walls being foldable at their joined bottom edges from their angularly spaced relationship to a position wherein they form a double wall strip for storage purposes, and attaching means on the planar surface of the first wall for securing the trough structure to a support surface for the collection of a liquid flowing along said support surface above the trough channel.

2. The detachable trough structure of claim 1 wherein the attaching means is a recess means in the planar surface to act as suction cup means.

3. The detachable trough structure of claim 1 wherein the attaching means is a layer of adhesive on the planar surface.

4. The detachable trough structure of claim 1 wherein the first and second walls are positively held in their spaced V-shaped cross sectional position by removable means placed between said walls.

5. The detachable trough structure of claim 1 wherein a closure is provided for an open end of the trough channel, said closure comprising a body having a wall closing off the open end, an extension on the wall containing a cavity of a V-shaped configuration compelementary to the V-shaped trough body, said cavity receiving the end of the body and thereby sealing the open end.

6. The detachable trough structure of claim 1 wherein an opening is provided in the body communicating with the trough channel; a hose connected to said opening, and pump means connected to said hose.

7. The detachable trough structure of claim 1 wherein an open end of the trough channel between the walls is closed off by a clamp device pinching the opposing wall edges at the end together to from a liquid tight joint at the space end.

8. The detachable trough structure of claim 7 wherein the attaching means comprise recess means in the planar surface to act as suction cup means.

9. The detachable trough structure of claim 7 wherein the attaching means comprise a layer of an adhesive medium on the planar surface.

10. The detachable trough structure of claim 1 wherein two adjacent trough bodies may be coupled together to form a continuous body by a coupling comprising a body, an open ended through cavity extending through said body having a general V-shaped cross section complementary to the V-shape of the trough body, the adjacent ends of said trough bodies fitting into the opposing ends of the trough cavity in the coupling body.

11. The detachable trough structure of claim 10, wherein the inner surface of the trough cavity is provided with parallel serrations for engaging the embedding into the ends of the trough bodies to thereby form a liquid tight joint therewith and a holding means for the bodies.

* * * * *